United States Patent
Ng et al.

(10) Patent No.: US 9,911,254 B2
(45) Date of Patent: Mar. 6, 2018

(54) ELECTRONIC LOCK DIGITAL KEYPAD INTERFACE

(71) Applicant: Bretford Manufacturing, Inc., Franklin Park, IL (US)

(72) Inventors: Hubert Benjamin Ki Durn Ng, Park Ridge, IL (US); Jim Fisher, Gurnee, IL (US); Robert Gabriel, Lisle, IL (US); Caleb Durante, Oak Park, IL (US); Cary Maguire, Chicago, IL (US); Christopher Brandel, Northfield, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 126 days.

(21) Appl. No.: 15/210,183

(22) Filed: Jul. 14, 2016

(65) Prior Publication Data

US 2017/0081877 A1   Mar. 23, 2017

Related U.S. Application Data

(60) Provisional application No. 62/219,825, filed on Sep. 17, 2015.

(51) Int. Cl.
| | | |
|---|---|---|
| E05B 17/00 | (2006.01) | |
| G07C 9/00 | (2006.01) | |
| E05B 17/10 | (2006.01) | |
| E05B 41/00 | (2006.01) | |
| G06F 3/02 | (2006.01) | |
| G08B 5/36 | (2006.01) | |

(52) U.S. Cl.
CPC .............. *G07C 9/00* (2013.01); *E05B 17/10* (2013.01); *E05B 41/00* (2013.01); *G06F 3/0219* (2013.01); *G08B 5/36* (2013.01)

(58) Field of Classification Search
CPC ................................. E05B 41/00; E05B 17/10
See application file for complete search history.

(56) References Cited

U.S. PATENT DOCUMENTS

| | | | | |
|---|---|---|---|---|
| 2016/0007194 A1* | 1/2016 | Shim | ...................... | H04W 12/06 455/411 |
| 2016/0178159 A1* | 6/2016 | Clark | .................. | E05B 65/0075 362/23.14 |
| 2016/0358390 A1* | 12/2016 | Imada | ................. | G07C 9/00174 |
| 2017/0335606 A1* | 11/2017 | Schatz | ..................... | E05B 81/77 |

* cited by examiner

*Primary Examiner* — Christle I Marshall
(74) *Attorney, Agent, or Firm* — Anderson Gorecki LLP

(57) ABSTRACT

A digital keypad interface includes a keypad having a plurality of keys, a lock status indicator, a first set of LEDs set around a periphery of the lock status indicator, an unlock status indicator, and a second set of LEDs set around a periphery of the unlock status indicator. A microprocessor is provided to sequentially light LEDs of the first set of LEDs during a locking sequence of inputs via the keypad and to sequentially light LEDs of the second set of LEDs during an unlocking sequence of inputs via the keypad.

17 Claims, 7 Drawing Sheets

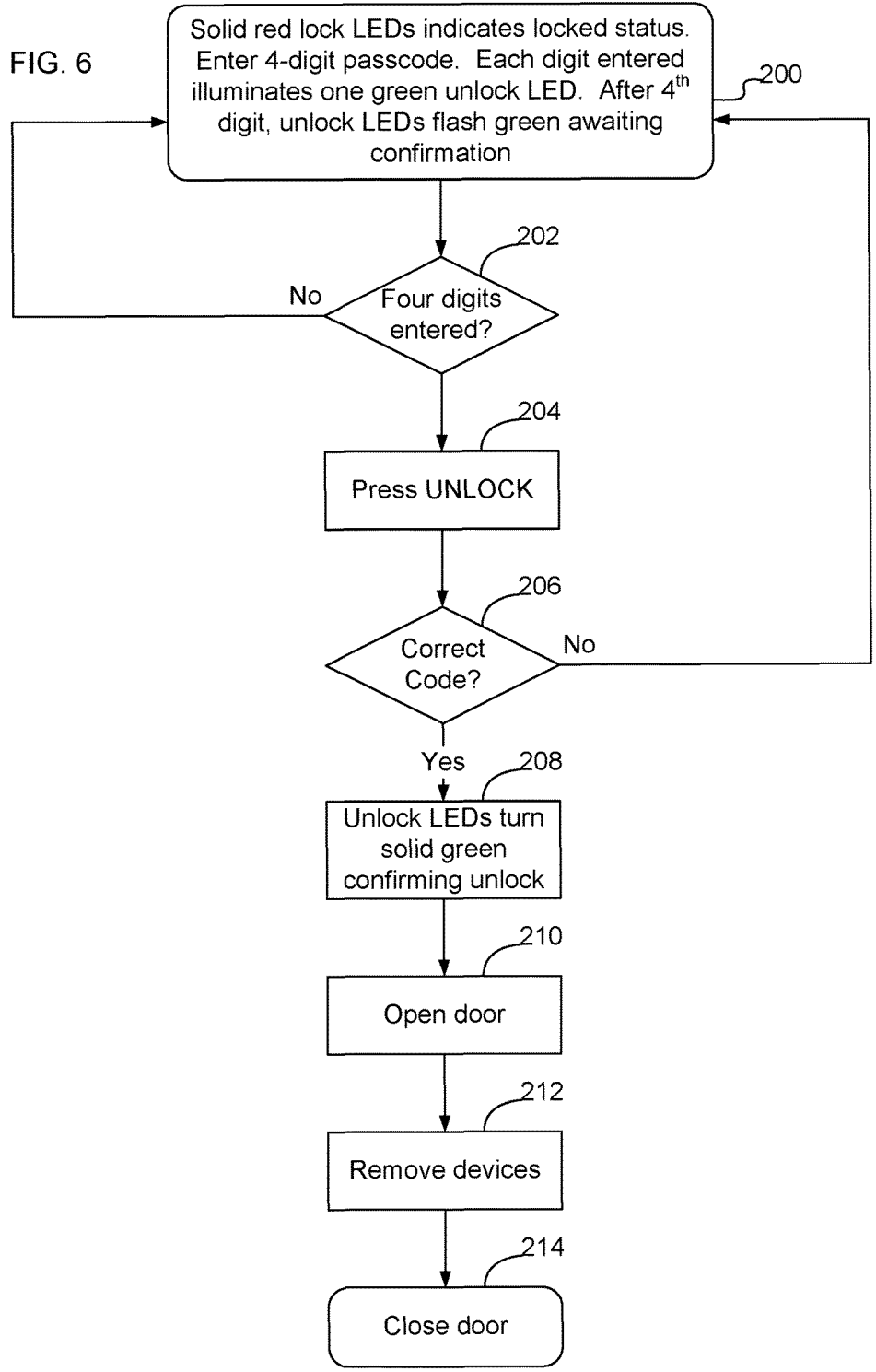

FIG. 7A

| LED State 700 | Description | Status 800 |
|---|---|---|
| 701 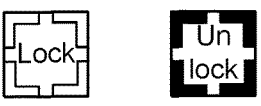 | • Lock LEDs off<br>• 4 unlock LEDs solid green | 801<br>• Unlocked<br>• Press UNLOCK to open door |
| 702 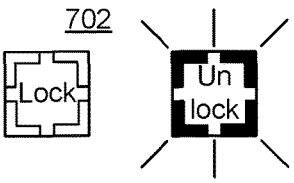 | • Lock LEDs off<br>• 4 unlock LEDs blinking green | 802<br>• Unlocked<br>• Awaiting Passcode input |
| 703 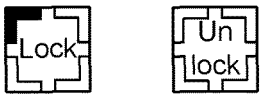 | • 1 lock LED solid red<br>• Unlock LEDs off | 803<br>• Unlocked<br>• 1 of 4 passcode digits entered<br>• 3 more digits required |
| 704 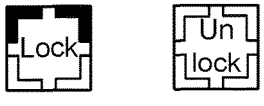 | • 2 lock LED solid red<br>• Unlock LEDs off | 804<br>• Unlocked<br>• 2 of 4 passcode digits entered<br>• 2 more digits required |
| 705 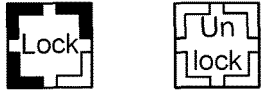 | • 3 lock LED solid red<br>• Unlock LEDs off | 805<br>• Unlocked<br>• 3 of 4 passcode digits entered<br>• 1 more digit required |
| 706 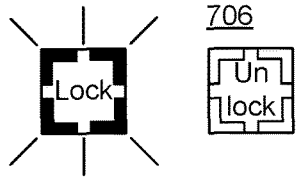 | • 4 lock LED blinking red<br>• Unlock LEDs off | • Unlocked 806<br>• 4 of 4 passcode digits entered<br>• Press LOCK to confirm |

FIG. 7B

| LED State | Description | Status |
|---|---|---|
| 707 <br> Lock  Un lock | • 4 lock LEDs solid red <br> • Unlock LEDs off | 807 <br> • Locked <br> • Enter passcode to begin unlock sequence |
| 708 <br> Lock  Un lock | • 4 lock LEDs solid red <br> • 1 unlock LEDs solid green | 808 <br> • Locked <br> • 1 of 4 passcode digits entered <br> • 3 more digits required |
| 709 <br> Lock  Un lock | • 4 lock LEDs solid red <br> • 2 unlock LEDs solid green | 809 <br> • Locked <br> • 2 of 4 passcode digits entered <br> • 2 more digits required |
| 710 <br> Lock  Un lock | • 4 lock LEDs solid red <br> • 3 unlock LEDs solid green | 810 <br> • Locked <br> • 3 of 4 passcode digits entered <br> • 1 more digit required |
| 711 <br> Lock  Un lock | • 4 lock LEDs solid red <br> • 4 unlock LEDs blinking green | 811 <br> • Locked <br> • 4 of 4 passcode digits entered <br> • Press UNLOCK to confirm |

ELECTRONIC LOCK DIGITAL KEYPAD INTERFACE

CROSS-REFERENCE TO RELATED APPLICATIONS

This application claims priority to Provisional Application 62/219,825 filed Sep. 17, 2015, the content of which is hereby incorporated herein by reference.

BACKGROUND

This disclosure relates to a programmable lock and, more particularly, to an electronic lock digital keypad interface.

SUMMARY

All examples and features mentioned below can be combined in any technically possible way.

In one aspect, a digital keypad interface, includes a keypad having a plurality of keys, a lock status indicator, a first set of LEDs set around a periphery of the lock status indicator, an unlock status indicator, and a second set of LEDs set around a periphery of the unlock status indicator. The digital keypad interface is configured to sequentially illuminate LEDs of the first set of LEDs during a locking sequence of inputs via the keypad and to sequentially illuminate LEDs of the second set of LEDs during an unlocking sequence of inputs via the keypad.

In some implementations, in an unlocked state, all LEDs in the second set of LEDs are illuminated a solid color.

In certain implementations, in an unlocked state, upon receipt of input via the unlock status indicator, the LEDs in the second set of LEDs will blink.

In some implementations, during a locking sequence, upon entry of a first digit via the keypad a first LED of the first set of LEDs will turn on and remain on until a required number of digits have been entered via the keypad.

In certain implementations, during the locking sequence, upon entry of subsequent digits via the keypad, subsequent LEDs of the first set of LEDs will turn on and remain on until the required number of digits have been entered via the keypad.

In some implementations, during the locking sequence, once the required number of digits have been entered via the keypad, the LEDs of the first set of LEDs will blink.

In certain implementations, during the locking sequence, upon receipt of input via the lock status indicator, the locking sequence will conclude and the LEDs of the first set of LEDs are illuminated a solid color.

In some implementations, during an unlocking sequence, upon entry of a first digit via the keypad a first LED of the second set of LEDs will turn on and remain on until a required number of digits have been entered via the keypad.

In certain implementations, during the unlocking sequence, upon entry of subsequent digits via the keypad, subsequent LEDs of the second set of LEDs will turn on and remain on until the required number of digits have been entered via the keypad.

In some implementations, during the unlocking sequence, once the required number of digits have been entered via the keypad, the LEDs of the second set of LEDs will blink.

In certain implementations, during the unlocking sequence, upon receipt of input via the unlock status indicator, the unlocking sequence will conclude and the LEDs of the second set of LEDs are illuminated a solid color.

In some implementations, the keypad is a pushbutton touch pad having ten labeled tactile keys for passcode entry, wherein the lock status indicator is a tactile key, and wherein the unlock status indicator is a tactile key.

In certain implementations, the lock status indicator is a first square tactile key, and wherein the first set of LEDs are formed at the corners of the first square tactile key.

In some implementations, the unlock status indicator is a second square tactile key, and wherein the first set of LEDs are formed at the corners of the second square tactile key.

In certain implementations, the keypad is a pushbutton touch pad having ten labeled capacitive keys for passcode entry, wherein the lock status indicator is a capacitive key, and wherein the unlock status indicator is a capacitive key.

In some implementations, the lock status indicator is a first square capacitive key, and wherein the first set of LEDs are formed at the corners of the first square capacitive key.

In certain implementations, the unlock status indicator is a second square capacitive key, and wherein the first set of LEDs are formed at the corners of the second square capacitive key.

BRIEF DESCRIPTION OF THE DRAWINGS

FIG. 6 is a flow chart showing a process implemented using the digital keypad interface in connection with transitioning the digital keypad interface from a locked state to an unlocked state.

FIGS. 7A-7B are tables corresponding digital keypad interface LED status indicators and digital keypad interface state.

DETAILED DESCRIPTION

This disclosure is based, at least in part, on the realization that it is desirable to provide an electronic lock digital keypad interface having an intuitive indication of how many digits the user has entered and how many more digits the user needs to enter to complete a locking or unlocking sequence.

In one implementation, the digital keypad interface is configured to be used to control activation of an electronic lock having a locking mechanism that is operative to engage one or more latches to cause a mechanism such as a door to be secured. For example, the locking system may be used to secure a locker door, cabinet door, computer cart door, drawer, or other physical enclosure to prevent unintended access to an interior compartment. For example, the electronic lock digital keypad interface may be utilized on electronic locks utilized to secure individual storage compartments of a storage system such as the electronic device storage system described in greater detail in U.S. Provisional Patent Application No. 62/199,365, entitled Charging Locker, filed Jul. 31, 2015, the content of which is hereby incorporated by reference.

In some implementations, the digital keypad interface is associated with an electronic lock that controls a single locking mechanism to control access to a single compartment. In other implementations, the digital keypad interface is associated with an electronic lock that controls multiple locking mechanisms to individually control access to multiple individual compartments, such that a single keypad interface can control individual access to the individual compartments associated with the electronic lock.

Figure 1:
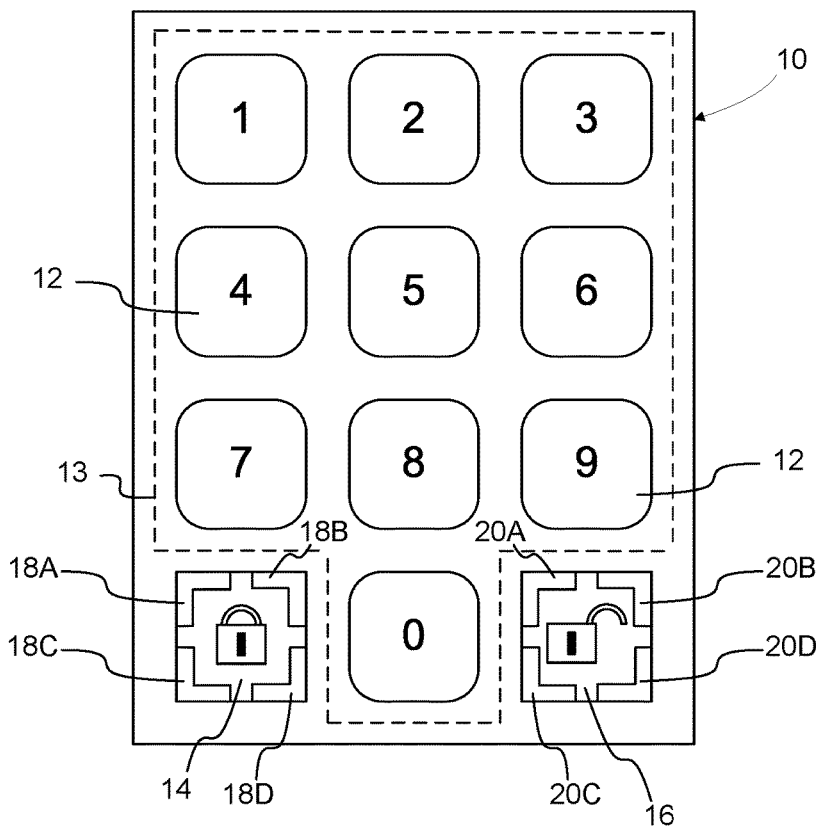
FIG. 1 is a front view of an electronic lock digital keypad interface according to an implementation.

FIG. 1 is a front view of an electronic lock digital keypad interface according to an implementation. As shown in FIG. 1, the digital keypad interface 10 includes a plurality of keys 12 forming a keypad for entry of input, a lock status indicator 14, and an unlock status indicator 16. The lock status indicator 14 in one implementation is a LOCK confirmation button usable to instruct the digital keypad interface to attempt a transition from an unlocked state to a locked state. The unlock status indicator 16, in one implementation, is an UNLOCK confirmation button usable to instruct the digital keypad interface to attempt a transition from a Locked state to an unlocked state.

The keypad in the implementation shown in FIG. 1 includes 10 keys labeled 0-9. Other labels for the keys may be utilized as well, and likewise the keypad may include fewer or additional keys depending on the implementation. In one implementation, the keys are tactile keys. In another implementation, the keys are capacitive keys. The lock status indicator 14 in the implementation shown in FIG. 1 is labeled with an icon in the shape of a closed lock to indicate visually the concept of locking. Likewise the unlock status indicator 16 in this implementation is labeled with an icon in the shape of an opened lock to indicate visually the concept of unlocking. In another implementation the lock status indicator is labeled with the word "LOCK" and the unlock status indicator 16 is labeled with the word "UNLOCK". In one implementation, the unlock and lock status indicators are tactile keys. In another implementation, the unlock and lock status indicators are capacitive keys.

The lock status indicator includes a first set of lights 18A-18D implemented, for example, using Light Emitting Diodes (LEDs). The unlock status indicator includes a second set of lights 20A-20D implemented, for example, using LEDs. In the following description the lights 18A-18D and 20A-20D are described as being implemented using LEDs. Other forms of lights may be utilized as well.

In the implementation shown in FIG. 1 the first set of LEDs includes four LEDs 18A-18D and the second set of LEDs includes four LEDs 20A-20D. The number of LEDs in each set of LEDs depends on the number of digits required to execute a locking sequence via the digital keypad interface or to execute an unlocking sequence via the digital keypad interface. In an implementation such as shown in FIG. 1, where a user must make four sequential entries via the keys 12 of the digital keypad interface to activate a locking sequence, the first set of LEDs will include four LEDs which sequentially light up as the user enters the four sequential entries. Likewise, in an implementation such as shown in FIG. 1, where a user must make four sequential entries via the keys 12 of the digital keypad interface to activate an unlocking sequence, the second set of LEDs will include four LEDs which sequentially light up as the user enters the four sequential entries. If the user were required to enter a different number of entries, such as six sequential entries to enter a six digit code, the first and second sets would correspondingly include six LEDs.

In an implementation each of the sequential entries may be implemented by pushing or touching a single key 12 of keypad 13. In another implementation one or more of the sequential entries may be implemented by simultaneously pushing multiple keys 12 of keypad 13.

In an implementation, as shown in FIG. 1, the LEDs 18A-18D of the first set of LEDs are arranged around corners of the lock status indicator. LEDs of the first set of LEDs that are arranged around the lock status indicator will also be referred to herein as "lock LEDs". Likewise, the LEDs 20A-20D of the second set of LEDs are arranged around corners of the unlock status indicator. LEDs of the second set of LEDs that are arranged around the unlock status indicator will also be referred to herein as "unlock LEDs". By arranging the LEDs in this manner it becomes intuitive to the user as to where the user is in the lock sequence and unlock sequence. Specifically, by sequentially illuminating LEDs in the corners of the lock indicator, the user is intuitively provided with an indication that the user is in the process of locking an associated lock, how many inputs have been received, and how many more inputs are required to complete the lock sequence. Likewise, by sequentially illuminating LEDs in the corners of the unlock indicator, the user is intuitively provided with an indication that the user is in the process of unlocking an associated lock, how many inputs have been received, and how many more inputs are required to complete the unlock sequence. Optionally the user may reset progression through the lock or unlock sequence by touching/pushing the lock and/or unlock status indicators, for example if the user made a mistake when entering a code into the digital keypad interface. In another implementation a different combination of keys may be used to reset the digital keypad interface to a previous state when an error is made entering a lock or unlock sequence of digits.

Figure 2:
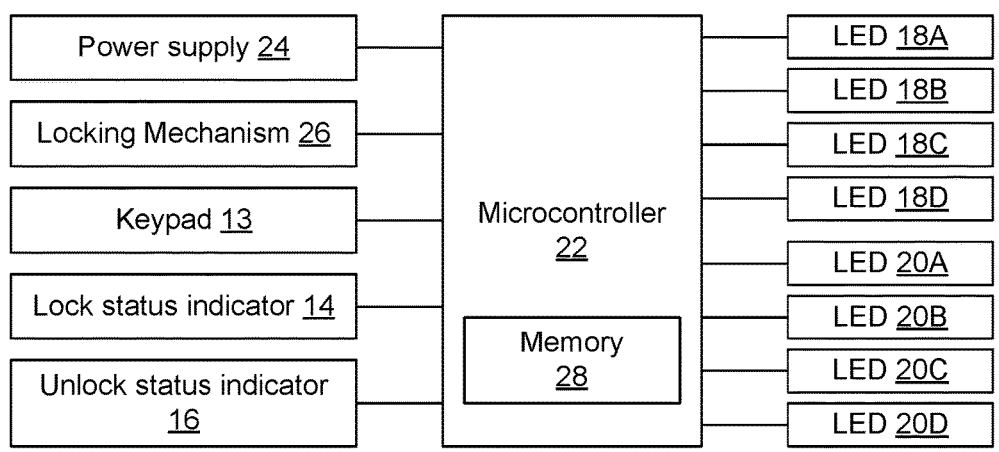
FIG. 2 is a functional block diagram of an example control system for the electronic lock digital keypad interface of FIG. 1.

FIG. 2 is a functional block diagram of an example control system for an electronic lock digital keypad interface of FIG. 1. As shown in FIG. 2, in this implementation a microcontroller 22 receives power from power supply 24, receives user input from keypad 13, lock status indicator 14 and unlock status indicator 16, and provides an output that may be used by an electronic lock to trigger activation of locking mechanism 26. Microcontroller also is connected to and controls the illumination state of LEDs 18A-18D and LEDs 20A-20D. Activation of a locking mechanism may involve extension or retraction of a plunger, energization or de-energization of an electromagnet, or other form of actuation to physically secure a door or other access to a contained area.

Implementations of the systems and methods described herein comprise electrical components and one or more microprocessors or Application Specific Integrated Circuits (ASICs) configured to perform the processes to support the digital keypad interface described herein. For example, it should be understood by one of skill in the art that the steps may be stored as computer-executable instructions on a computer-readable medium such as, for example, memory 28. Furthermore, it should be understood by one of skill in the art that the executable instructions may be executed on a variety of processors such as, for example, one or more microprocessors, microcontroller 22, one or more digital signal processors, gate arrays, ASICs, or other electronic components. In addition, the instructions may be implemented in a high-level procedural and/or object-oriented programming language, and/or in assembly/machine language. Those skilled in the art will recognize that the state changes of the digital keypad interface may be implemented using corresponding electronic components or software components. Such system and/or software components are therefore enabled by describing their corresponding steps or elements (that is, their functionality), and are within the scope of the disclosure.

In the description contained herein, the digital keypad interface will be described as "transitioning" from a locked state to an unlocked state, or "transitioning" from an unlocked state to a locked state. It should be understood that the term digital keypad interface, as that term is used herein, is used to refer to the components of an electronic locking system that provide the user with an ability to interact with an electronic lock to control operation of the electronic lock. Upon entry of a key sequence, as described in greater detail below, the digital keypad interface will "transition" between the locked and unlocked states and, concordantly, the electronic lock under the control of the digital keypad interface will activate a locking mechanism to physically manifest this transition in the electronic locking mechanism. The description, therefore, will focus on the state of the digital keypad interface with the underlying assumption that the state of the associated electronic lock, i.e. the locked or unlocked state of the associated electronic lock, will correspond with the state of the digital keypad interface.

During a locking operation, where the digital keypad interface transitions from an unlocked state to a locked state, a user engages keys 12 of keypad 13 to provide a sequence of inputs to microcontroller 22. The microcontroller records the sequence of inputs and, upon receipt of each of the sequence of inputs, activates a successive one of the first set of LEDs 18A-18D. Upon completion of entry of the sequence of inputs a signal is output that may be used by the electronic lock to trigger activation (locking) of the locking mechanism 26. The sequence of inputs that resulted in transition from the unlocked state to the locked state is stored in memory 28. Memory 28 may be a register or other non-volatile electronic memory.

During an unlocking operation, where the digital keypad interface transitions from a locked state to an unlocked state, the user is required to input a sequence of inputs via keys 12 that match the sequence of inputs that are stored in memory 28. During the unlocking operation, the user engages keys 12 of keypad 13 to provide an unlocking sequence of inputs to microcontroller 22. The microcontroller records the sequence of inputs and, upon receipt of each of the sequence of inputs, activates a successive one of the second set of LEDs 20A-20D. Upon completion of entry of the sequence of unlocking inputs, a comparison is made to the sequence of inputs stored in memory 28. If the sequence of unlocking inputs matches the sequence of locking inputs stored in memory 28, a signal is output that may be used by the electronic lock to trigger activation (unlocking) of the locking mechanism 26. If the sequence of unlocking inputs does not match the sequence of locking inputs stored in memory 28, the digital keypad interface does not output a locking mechanism activation signal to the electronic lock. Optionally, upon receipt of a sequence of unlocking inputs that does not match the stored sequence of locking inputs, the LEDs of the second set of LEDs may flash to indicate that an error occurred. Likewise flashing LEDs may be used in other manners to convey state information of the electronic lock digital keypad interface as described in greater detail below.

FIGS. 3A-3D show states of the digital keypad interface as passcode digits are entered in connection with causing the digital keypad interface to transition from an unlocked state to a locked state. In the illustrated sequence, the selected sequence of locking inputs is the string of individual inputs #1, #2, #3, #4, which are input by touching key 1, key 2, key 3, and key 4, of the keypad 13. Any other desired passcode can be selected and the passcode sequence of 1, 2, 3, 4 is used merely as an example.

Figure 3A:
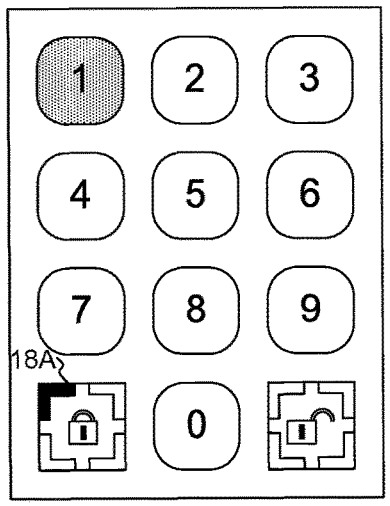
FIGS. 3A-3D show states of the electronic lock digital keypad interface as digits are entered in connection with causing the digital keypad interface to transition from an unlocked state to a locked state.

In FIG. 3A, the user provides a first locking input by touching or pressing key #1 of keypad 13. Upon receipt of this first input, the microcontroller causes the first LED 18A of the first set of LEDs to be illuminated.

Figure 3B:
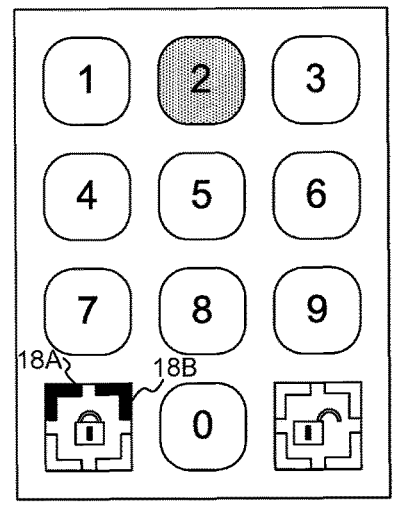

Next, as shown in FIG. 3B, the user provides a second locking input by touching or pressing key #2 of keypad 13. Upon receipt of this second input, the microcontroller causes the second LED 18B of the first set of LEDs to be illuminated.

Figure 3C:
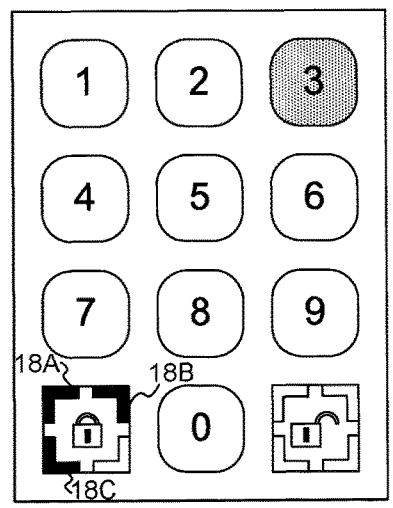

Then, as shown in FIG. 3C, the user provides a third locking input by touching or pressing key #3 of keypad 13. Upon receipt of this third input, the microcontroller causes the third LED 18C of the first set of LEDs to be illuminated.

Figure 3D:
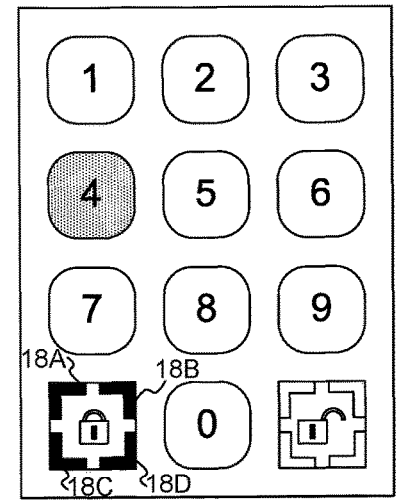

Finally, as shown in FIG. 3D, the user provides a fourth locking input by touching or pressing key #4 of keypad 13. Upon receipt of this fourth input, the microcontroller causes the fourth LED 18D of the first set of LEDs to be illuminated.

Upon receipt of the fourth input, the user may be prompted to confirm transition from the unlocked state to the locked state, for example by being prompted to press the LOCK button associated with the lock status indicator. In one implementation this is implemented by causing the LEDs of the first set of LEDs to blink. Once the digital keypad interface has transitioned to the locked state, the LEDs of the first set of LEDs (lock LEDs) will be continuously illuminated to indicate that the digital keypad interface is in the locked state.

By sequentially receiving inputs from the user and responsively sequentially illuminating LEDs of the first set of LEDs located at the corners of the lock status indicator, the user is provided with input as to how many inputs have been input in connection with causing the digital keypad interface to transition to the locked state. Since there are four corners to the lock status indicator, the user is also intuitively instructed that the user needs to input a total of four inputs to cause each of the corners of the lock status indicator to be illuminated and hence to cause the digital keypad interface to transition to the locked state. Upon entry of the required set of inputs, by causing the LEDs of the first set of LEDs to blink, the digital keypad interface is able to prompt the user to press the LOCK button to cause the transition to be initiated.

FIGS. 4A-4D show states of the digital keypad interface as digits are entered in connection with causing the digital keypad interface to transition from a locked state to an unlocked state. In the illustrated sequence, the selected sequence of unlocking inputs is required to match the string of locking inputs that previously caused the locking mechanism to be engaged. Accordingly, in the illustrated example, the string of unlocking inputs will be assumed to be a string of individual inputs #1, #2, #3, #4 which is to be entered via keys 1, 2, 3, 4, of keypad 13.

Figure 4A:
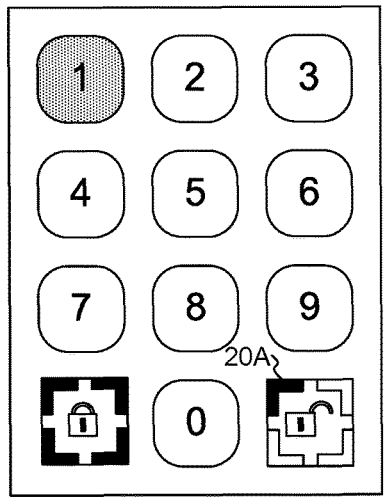
FIGS. 4A-4D show states of the digital keypad interface as digits are entered in connection with causing a locking mechanism associated with causing the digital keypad interface to transition from a locked state to an unlocked state.

In FIG. 4A, the user provides a first unlocking input by touching or pressing key #1 of keypad 13. Upon receipt of this first input, the microcontroller causes the first LED 20A of the second set of LEDs to be illuminated. Note that because the digital keypad interface is in the locked state, the LEDs of the first set of LEDs (the lock LEDs) will remain illuminated at this point and will remain illuminated until the correct code is entered and confirmed to cause transition of the digital keypad interface to the unlocked state.

Figure 4B:
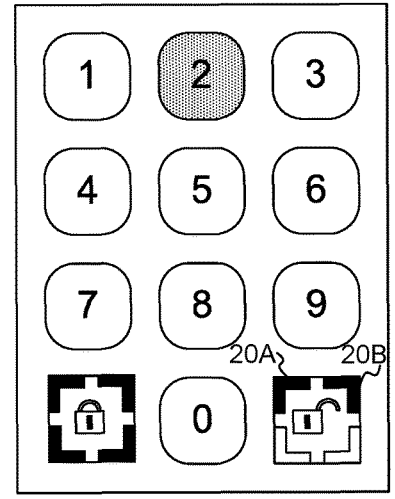

Next, as shown in FIG. 4B, the user provides a second unlocking input by touching or pressing key #2 of keypad 13. Upon receipt of this second input, the microcontroller causes the second LED 20B of the second set of LEDs to be illuminated.

Figure 4C:
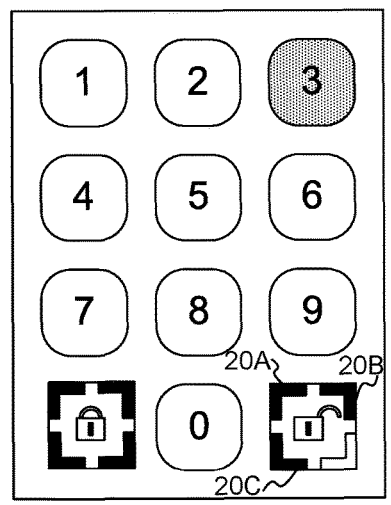

Then, as shown in FIG. 4C, the user provides a third unlocking input by touching or pressing key #3 of keypad 13. Upon receipt of this third input, the microcontroller causes the third LED 20C of the second set of LEDs to be illuminated.

Figure 4D:
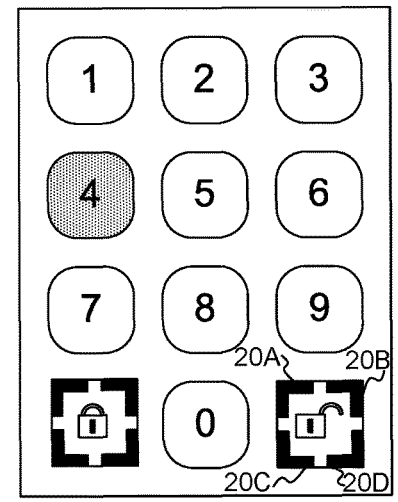

Finally, as shown in FIG. 4D, the user provides a fourth unlocking input by touching or pressing key #4 of keypad 13. Upon receipt of this fourth input, the microcontroller causes the fourth LED 20D of the second set of LEDs to be illuminated. Upon receipt of the fourth input, the user may be prompted to confirm transition from the locked state to the unlocked state, for example by being prompted to press the UNLOCK button associated with the unlock status indicator. In one implementation this is implemented by causing the LEDs of the second set of LEDs to blink. Once the digital keypad interface has transitioned to the unlocked state, the LEDs of the second set of LEDs (unlock LEDs) will be continuously illuminated to indicate that the digital keypad interface is in the unlocked state. The LEDs of the first set of LEDs (lock LEDs) will be turned off in this state.

By sequentially receiving inputs from the user and responsively sequentially illuminating LEDs of the second set of LEDs located at the corners of the unlock status indicator, the user is provided with input as to how many inputs have been input in connection with causing the digital keypad interface to transition to the unlocked state. Since there are four corners to the unlock status indicator, the user is also intuitively instructed that the user needs to input a total of four inputs to cause each of the corners of the unlock status indicator to be illuminated and hence to cause the digital keypad interface to transition to the unlocked state. Upon entry of the required set of inputs, by causing the LEDs of the second set of LEDs to blink, the digital keypad interface is able to prompt the user to press the UNLOCK button to cause the transition to be initiated.

In the illustrated implementation, once a given LED of the first set of LEDs is illuminated during the locking sequence, the LED will remain illuminated for the remainder of the locking sequence. This is shown in the sequence of FIGS. 3A-3D in which LED 18A is illuminated in FIG. 3A and remains illuminated in FIGS. 3B-3D. Likewise, although LED 18B is not illuminated in FIG. 3A, once LED 18B is illuminated in FIG. 3B it will remain illuminated for the rest of the locking sequence shown in FIGS. 3C and 3D.

The same is true for the unlocking sequence. Specifically, once a given LED of the second set of LEDs is illuminated during the unlocking sequence, the LED will remain illuminated for the remainder of the unlocking sequence. This is shown in the sequence of FIGS. 4A-4D in which LED 20A is illuminated in FIG. 4A and remains illuminated in FIGS. 4B-4D. Likewise, although LED 20B is not illuminated in FIG. 4A, once LED 20B is illuminated in FIG. 4B it will remain illuminated for the rest of the locking sequence shown in FIGS. 4C and 4D.

In one implementation, digital keypad interface 10 is reprogrammable every use, such that a new code is able to be input in each instance where the digital keypad interface is to transition from the unlocked state to the locked state. In this implementation, the microcontroller does not store an input sequence when the digital keypad interface is in the unlocked state, so that any desired four digit key sequence (four digit code) may be used to cause the digital keypad interface to transition from the unlocked state to the locked state using the locking sequence shown in FIGS. 3A-3D. However, since the microcontroller will store the four digit key sequence (four digit code) entered during locking sequence, the same sequence of inputs must be recalled and entered as shown in FIGS. 4A-4D to cause the digital keypad interface to transition from the locked state to the unlocked state.

In another implementation a set code may be associated with a particular digital keypad interface such that the digital keypad interface will store the predetermined code in memory while in the unlocked state and will only transition to the locked state if the correct code is entered during the locking sequence shown in FIGS. 3A-3D. This may be advantageous, for example, where a particular storage compartment has been assigned to a particular individual so that only that particular individual is able to cause the digital keypad interface to send an activation signal to an associated electronic lock to secure the storage compartment.

Optionally the digital keypad interface may be programmed to store a master code in memory 28 to be used in the event that the four digit code that was selected during the locking sequence cannot be recollected. The master code may be significantly longer than the series of four inputs required to proceed through the locking sequence. For example, the master code may be a code of 10-12 sequential inputs that is itself user-programmable.

Figure 5:
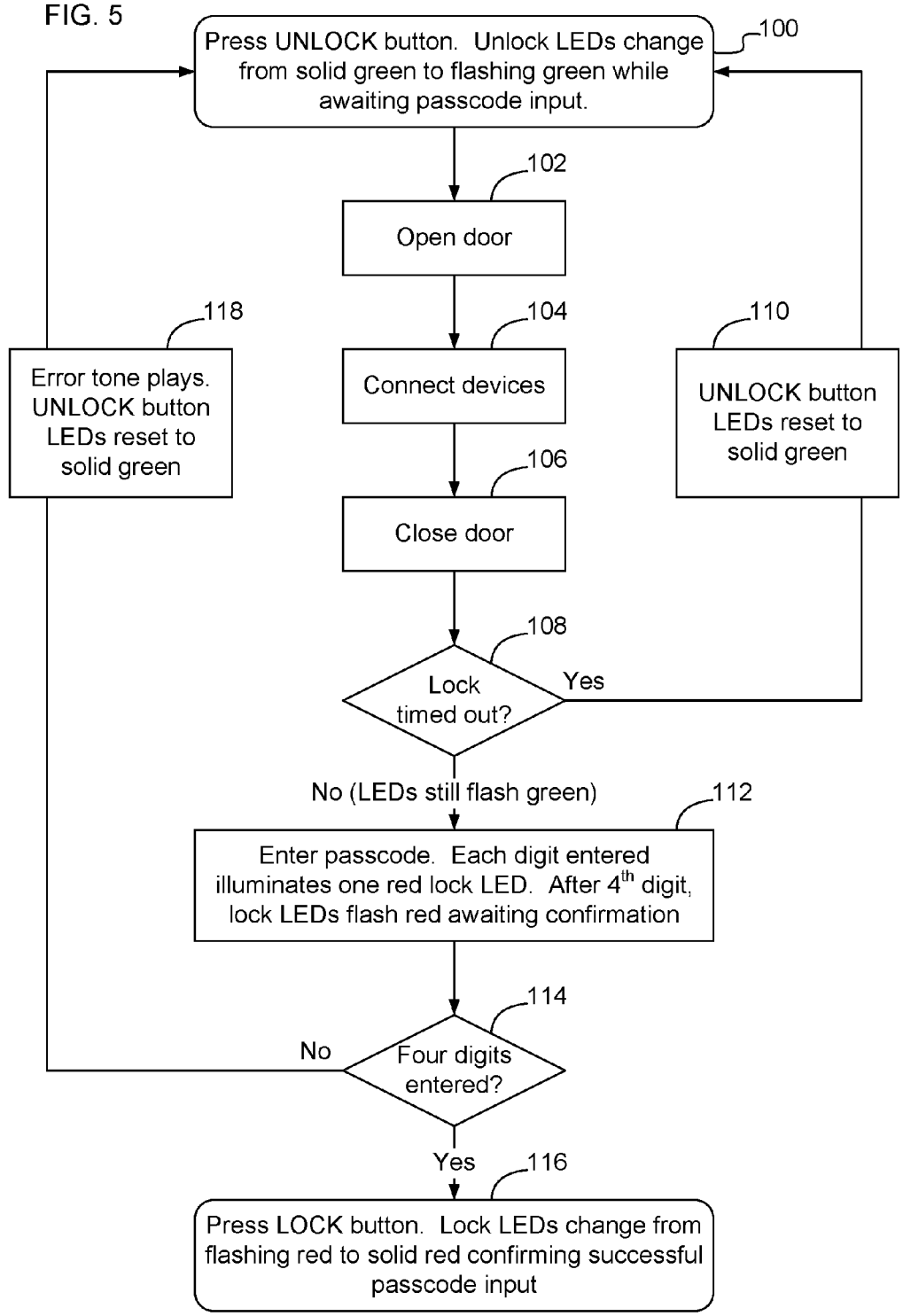
FIG. 5 is a flow chart showing a process implemented using the digital keypad interface in connection with transitioning the digital keypad interface from an unlocked state to a locked state.

FIG. 5 is a flow chart showing a process implemented using the digital keypad interface in connection with generating a signal to be output to an electronic lock to instruct the lock to activate, i.e. to transition from an unlocked state to a locked state according to an implementation. For example, the digital keypad interface may be utilized on a storage system such as an electronic device storage system described in greater detail in U.S. Provisional Patent Application No. 62/199,365, entitled Charging Locker, filed Jul. 31, 2015, the content of which is hereby incorporated by reference. The description of FIG. 5 will assume that the digital keypad interface is associated with a locking system that is used to secure a storage compartment. such as one of the charging storage compartments described in this provisional application.

If a user would like to store an electronic device or other goods in a charging compartment, the user will locate an available charging compartment by looking for a digital keypad interface on a charging compartment that has the unlock LEDs illuminated solid green. To select the charging compartment, the user will press the UNLOCK button on the selected charging compartment. Upon pressing the UNLOCK button, the LEDs will change from solid green to flashing green while awaiting passcode input (100). Optionally, pressing the UNLOCK button causes the digital keypad interface to output a signal to the electronic lock to instruct the electronic lock to retract a plunger associated with the lock to enable the door of the storage compartment to be opened.

The user is then provided with time to open the compartment door (102), connect devices to electrical charging outlets provided within the compartment (104) and close the door (106).

After pressing the UNLOCK button, the user is provided with a period of time to enter a four digit code to cause the digital keypad interface to transition from the unlocked state to the locked state. If the amount of time exceeds a timeout period (YES at block 108), the UNLOCK button LEDs are reset to solid green (110) and the process starts over.

If the timeout period has not been exceeded (NO at block 108), the user can use the keypad buttons to enter a passcode. Each digit entered causes one of the red lock LEDs to be illuminated. After the 4$^{th}$ digit is entered, the lock LEDs flash red awaiting confirmation (112).

If the user does not enter four digits (NO at block 114) the process starts over. If the user does enter four digits (YES at block 114) the user is allowed to confirm that the digital keypad interface should transition from the unlocked state to the locked state by pressing the LOCK button. When the LOCK button is pressed, the lock LEDs change from flashing red to solid red confirming successful passcode input (116) and a successful transition of the digital keypad interface from the unlocked to the locked state.

FIG. 6 is a flow chart showing a process implemented using the digital keypad interface in connection with generating a signal to be output to an electronic lock to instruct the lock to activate to transition from an unlocked state to a locked state according to an implementation. As shown in FIG. 6, in the locked state the lock LEDs are illuminated solid red to indicate that an electronic lock associated with the digital keypad interface is in a locked status. To cause the digital keypad interface to transition from the locked state to the unlocked state, the user enters the same four digit passcode that was used during the locking sequence when the digital keypad interface transitioned from the unlocked state to the locked state. Each digit entered causes one additional green unlock LED to be illuminated. After the fourth digit has been entered, the unlock LEDs flash green awaiting confirmation (200).

If the user does not enter four digits (NO at block 202) the digital keypad interface transitions back to a locked state in which the red lock LEDs continue to be illuminated solid red.

If the user enters four digits, the unlock LEDs flash green awaiting confirmation that the digital keypad interface should attempt a transition from the locked state to the unlocked state. If the user presses the UNLOCK button (204) a comparison will occur between the code that was entered and the code that was stored (206), to determine if the code that was entered to attempt to cause the digital keypad interface to transition to the unlocked state was the same as the code that was previously entered that caused the digital keypad interface to transition to the locked state. If the code is incorrect (NO at block 206), the digital keypad interface remains in the locked state in which the red lock LEDs continue to be illuminated solid red. If the code is correct (YES at block 206) the lock LEDs are turned off and the unlock LEDs are illuminated solid green confirming that the digital keypad interface has transitioned to the unlocked state (208). Where the digital keypad interface is associated with a charging compartment, the digital keypad interface will also send an activation signal to an associated electronic lock to instruct the electronic locking mechanism to withdraw a plunger or other securing mechanism to enable the door to the compartment to be opened. Once the electronic lock has unsecured the compartment, the door can be opened (210), any desired devices stored in the charging compartment can be disconnect from charging outlets (212), and the door of the compartment may be closed (214). The charging compartment is then ready for subsequent use either by the same user or a different user.

FIGS. 7A-7B are tables corresponding digital keypad interface LED status 700 and digital keypad interface state 800 according to an implementation. Transitions between the states shown in FIGS. 7A-7B may take place as described in greater detail above.

In state 701, the lock LEDs are off and the four unlock LEDs are illuminated solid green. The status 801 of the digital keypad interface in this state is that the digital keypad interface is unlocked and the user is able to press UNLOCK to cause the digital keypad interface to send a signal to an associated electronic locking mechanism to cause the associated electronic locking mechanism to activate a plunger to enable a door associated with the digital keypad interface to be opened.

In state 702, the lock LEDs are off and the four unlock LEDs are blinking green. The status 802 of the digital keypad interface in this state is that the digital keypad interface is unlocked and awaiting passcode input.

In state 703, one of the lock LEDs is illuminated solid red, the other three lock LEDs are off, and the 4 unlock LEDs are off. The status 803 of the digital keypad interface in this state is that the digital keypad interface is unlocked and one of four passcode digits have been entered, with three more passcode digits required.

In state 704, two of the lock LEDs are illuminated solid red, the other two lock LEDs are off, and the 4 unlock LEDs are off. The status 804 of the digital keypad interface in this state is that the digital keypad interface is unlocked and two of four passcode digits have been entered, with two more passcode digits required.

In state 705, three of the lock LEDs are illuminated solid red, the other lock LED is off, and the 4 unlock LEDs are off. The status 805 of the digital keypad interface in this state is that the digital keypad interface is unlocked and three of four passcode digits have been entered, with one more passcode digit required.

In state 706, the four lock LEDs are blinking red and the 4 unlock LEDs are off. The status 806 of the digital keypad interface in this state is that the digital keypad interface is unlocked, four of four passcode digits have been entered, and the digital keypad interface is ready to receive confirmation that it should transition from the unlocked to the locked state. In one implementation confirmation may be manifest by pressing the LOCK button.

In state 707, all four lock LEDs are illuminated solid red and the four unlock LEDs are off. The status 807 of the digital keypad interface in this state is that the digital keypad interface is locked and awaiting passcode input.

In state 708, all four lock LEDs are illuminated solid red, one of the unlock LEDs is illuminated solid green, and the other three unlock LEDs are off. The status 808 of the digital keypad interface in this state is that the digital keypad interface is locked and one of four passcode digits have been entered, with three more passcode digits required.

In state 709, all four lock LEDs are illuminated solid red, two of the unlock LEDs are illuminated solid green, and the other two unlock LEDs are off. The status 809 of the digital keypad interface in this state is that the digital keypad interface is locked and two of four passcode digits have been entered, with two more passcode digits required.

In state 710, all four lock LEDs are illuminated solid red, three of the unlock LEDs are illuminated solid green, and the other unlock LED is off. The status 810 of the digital keypad interface in this state is that the digital keypad interface is locked and three of four passcode digits have been entered, with one more passcode digit required.

In state 711, all four lock LEDs are illuminated solid red, and all four unlock LEDs are blinking green. The status 811 of the digital keypad interface in this state is that the digital keypad interface is locked, four of four passcode digits have been entered, and the digital keypad interface is ready to receive confirmation that it should transition from the locked to the unlocked state. In one implementation confirmation may be manifest by pressing the UNLOCK button. Upon pressing the unlock button, the digital keypad interface will transition to state 701.

The following reference numerals are used in the drawings:
10 electronic lock digital keypad interface
12 keys
13 keypad
14 lock status indicator
16 unlock status indicator
18 first set of LEDs
20 second set of LEDs
22 microcontroller
24 power supply
26 locking mechanism
28 memory A number of implementations have been described. Nevertheless, it will be understood that additional modifications may be made without departing from the scope of the inventive concepts described herein, and, accordingly, other implementations are within the scope of the following claims.

What is claimed is:

1. A digital keypad interface, comprising:
a keypad having a plurality of keys;
a lock status indicator;
a first set of LEDs set around a periphery of the lock status indicator;
an unlock status indicator; and
a second set of LEDs set around a periphery of the unlock status indicator;
wherein the digital keypad interface is configured to sequentially illuminate LEDs of the first set of LEDs during a locking sequence of inputs via the keypad and to sequentially illuminate LEDs of the second set of LEDs during an unlocking sequence of inputs via the keypad.

2. The digital keypad interface of claim 1, wherein in an unlocked state, all LEDs in the second set of LEDs are illuminated a solid color.

3. The digital keypad interface of claim 2, wherein in an unlocked state, upon receipt of input via the unlock status indicator, the LEDs in the second set of LEDs will blink.

4. The digital keypad interface of claim 1, wherein, during a locking sequence, upon entry of a first digit via the keypad a first LED of the first set of LEDs will turn on and remain on until a required number of digits have been entered via the keypad.

5. The digital keypad interface of claim 4, wherein, during the locking sequence, upon entry of subsequent digits via the keypad, subsequent LEDs of the first set of LEDs will turn on and remain on until the required number of digits have been entered via the keypad.

6. The digital keypad interface of claim 5, wherein, during the locking sequence, once the required number of digits have been entered via the keypad, the LEDs of the first set of LEDs will blink.

7. The digital keypad interface of claim 6, wherein, during the locking sequence, upon receipt of input via the lock status indicator, the locking sequence will conclude and the LEDs of the first set of LEDs are illuminated a solid color.

8. The digital keypad interface of claim 1, wherein, during an unlocking sequence, upon entry of a first digit via the keypad a first LED of the second set of LEDs will turn on and remain on until a required number of digits have been entered via the keypad.

9. The digital keypad interface of claim 8, wherein, during the unlocking sequence, upon entry of subsequent digits via the keypad, subsequent LEDs of the second set of LEDs will turn on and remain on until the required number of digits have been entered via the keypad.

10. The digital keypad interface of claim 9, wherein, during the unlocking sequence, once the required number of digits have been entered via the keypad, the LEDs of the second set of LEDs will blink.

11. The digital keypad interface of claim 10, wherein, during the unlocking sequence, upon receipt of input via the unlock status indicator, the unlocking sequence will conclude and the LEDs of the second set of LEDs are illuminated a solid color.

12. The digital keypad interface of claim 1, wherein the keypad is a pushbutton touch pad having ten labeled tactile keys for passcode entry, wherein the lock status indicator is a tactile key, and wherein the unlock status indicator is a tactile key.

13. The digital keypad interface of claim 12, wherein the lock status indicator is a first square tactile key, and wherein the first set of LEDs are formed at the corners of the first square tactile key.

14. The digital keypad interface of claim 12, wherein the unlock status indicator is a second square tactile key, and wherein the first set of LEDs are formed at the corners of the second square tactile key.

15. The digital keypad interface of claim 1, wherein the keypad is a pushbutton touch pad having ten labeled capacitive keys for passcode entry, wherein the lock status indicator is a capacitive key, and wherein the unlock status indicator is a capacitive key.

16. The digital keypad interface of claim 15, wherein the lock status indicator is a first square capacitive key, and wherein the first set of LEDs are formed at the corners of the first square capacitive key.

17. The digital keypad interface of claim 15, wherein the unlock status indicator is a second square capacitive key, and wherein the first set of LEDs are formed at the corners of the second square capacitive key.

\* \* \* \* \*